US011671818B1

(12) United States Patent
Arends et al.

(10) Patent No.: US 11,671,818 B1
(45) Date of Patent: Jun. 6, 2023

(54) RELIABLE LOCAL BREAKOUT FOR ROAMING DEVICES

(71) Applicant: T-Mobile USA, Inc., Bellevue, WA (US)

(72) Inventors: Joel Arends, Renton, WA (US); Nassereddine Sabeur, Bellevue, WA (US); Raymond Ball, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/244,066

(22) Filed: Apr. 29, 2021

(51) Int. Cl.
 *H04W 8/12* (2009.01)
 *H04L 61/4511* (2022.01)
 *H04W 88/16* (2009.01)
 *H04W 8/26* (2009.01)

(52) U.S. Cl.
 CPC ........... *H04W 8/12* (2013.01); *H04L 61/4511* (2022.05); *H04W 8/26* (2013.01); *H04W 88/16* (2013.01)

(58) Field of Classification Search
 None
 See application file for complete search history.

(56) References Cited

U.S. PATENT DOCUMENTS

| | | | |
|---|---|---|---|
| 6,061,650 A | 5/2000 | Malkin et al. |
| 6,434,627 B1 | 8/2002 | Millet et al. |
| 6,751,204 B1 | 6/2004 | Foti et al. |
| 7,130,625 B2 | 10/2006 | Akgun et al. |
| 7,328,014 B2 | 2/2008 | Takeda et al. |
| 7,391,748 B2 | 6/2008 | Feather |
| 7,844,728 B2 | 11/2010 | Anderson et al. |
| 7,940,697 B2 | 5/2011 | Savolainen et al. |
| 7,983,229 B2 | 7/2011 | Bachmann et al. |
| 8,027,309 B2 | 9/2011 | Kotecha et al. |
| 8,059,599 B1 | 11/2011 | Rogers et al. |
| 8,060,088 B2 | 11/2011 | Ihattula |
| 8,175,622 B2 | 5/2012 | Jiang |
| 8,179,903 B2 | 5/2012 | Gupta et al. |
| 8,238,905 B2 | 8/2012 | Jiang |
| 8,400,931 B2 | 3/2013 | Wong et al. |
| 8,406,170 B2 | 3/2013 | Rune |
| 8,428,601 B2 | 4/2013 | Samar et al. |
| 8,438,627 B1 | 5/2013 | Hirschman et al. |
| 8,483,174 B2 | 7/2013 | Ahmavaara et al. |
| 8,498,208 B2 | 7/2013 | Wang et al. |

(Continued)

*Primary Examiner* — Kenny S Lin
(74) *Attorney, Agent, or Firm* — Perkins Coie LLP

(57) ABSTRACT

Methods, devices, and system related to consistent and reliable local breakout for roaming devices are disclosed. In one example aspect, a method for wireless communication includes transmitting, by a user equipment that roams into a visited network, a request to a network node in the visited network to establish a connection using a first access technology. The method includes receiving, by the terminal device, a response from the network node. The response comprises an address of a gateway in the visited network. The gateway is configured to provide a secured tunnel to the terminal device for data transmissions using a second access technology. The method also includes initiating, by the terminal device, a connection with the gateway using the second access technology based on the address of the gateway, and performing, by the terminal device, data transmissions using the second access technology via the gateway in the visited network.

20 Claims, 8 Drawing Sheets

(56) References Cited

U.S. PATENT DOCUMENTS

| | | |
|---|---|---|
| 8,503,460 B2 | 8/2013 | Ahmavaara |
| 8,520,609 B2 | 8/2013 | Singh et al. |
| 8,607,309 B2 | 12/2013 | Ropolyi et al. |
| 8,638,747 B2 | 1/2014 | Radhakrishnan et al. |
| 8,654,709 B2 | 2/2014 | Centonza et al. |
| 8,743,828 B2 | 6/2014 | Wang et al. |
| 8,750,863 B2 | 6/2014 | Shah |
| 8,782,278 B2 | 7/2014 | Tsirtsis et al. |
| 8,934,894 B2 | 1/2015 | Du et al. |
| 8,971,239 B2 | 3/2015 | Oba et al. |
| 9,510,376 B2 | 11/2016 | Wang et al. |
| 9,602,332 B2 | 3/2017 | Shirota et al. |
| 9,788,188 B2 | 10/2017 | Xu et al. |
| 9,848,399 B2 | 12/2017 | Roeland |
| 9,867,098 B2 | 1/2018 | Kwok et al. |
| 9,871,828 B2 | 1/2018 | Mufti et al. |
| 9,888,375 B2 | 2/2018 | Zisimopoulos et al. |
| 10,021,533 B2 | 7/2018 | Chandramouli et al. |
| 10,028,174 B2 | 7/2018 | Jiang et al. |
| 10,117,137 B2 | 10/2018 | Rommer et al. |
| 10,292,040 B2 | 5/2019 | Dubesset et al. |
| 10,306,579 B2 | 5/2019 | Zhang et al. |
| 10,798,631 B2 | 10/2020 | Agarwal et al. |
| 10,897,418 B2 | 1/2021 | Faccin et al. |
| 10,984,128 B1 | 4/2021 | Hoffer |
| 11,271,937 B2 | 3/2022 | Wang et al. |
| 2006/0140150 A1 | 6/2006 | Olvera-hernandez et al. |
| 2008/0207168 A1 | 8/2008 | Forsberg |
| 2011/0261787 A1* | 10/2011 | Bachmann .......... H04W 12/037 370/331 |
| 2012/0044949 A1* | 2/2012 | Velev .................... H04W 8/082 370/401 |
| 2012/0224516 A1 | 9/2012 | Stojanovski et al. |
| 2014/0153559 A1* | 6/2014 | Roeland ................ H04W 60/00 370/338 |
| 2014/0328246 A1 | 11/2014 | Xu et al. |
| 2014/0341109 A1 | 11/2014 | Cartmell et al. |
| 2016/0295386 A1 | 10/2016 | Faccin et al. |
| 2016/0337310 A1* | 11/2016 | Faccin .................. H04W 76/10 |
| 2016/0337942 A1* | 11/2016 | Catovic .................. H04W 48/08 |
| 2017/0150420 A1 | 5/2017 | Olsson et al. |
| 2018/0110081 A1* | 4/2018 | Serna .................. H04L 63/0853 |
| 2018/0139692 A1* | 5/2018 | Liu ....................... H04W 48/18 |
| 2018/0288582 A1* | 10/2018 | Buckley .................. H04W 4/90 |
| 2019/0116624 A1* | 4/2019 | Tandon .................. H04W 76/12 |
| 2020/0053638 A1 | 2/2020 | Edge et al. |

\* cited by examiner

RELIABLE LOCAL BREAKOUT FOR ROAMING DEVICES

BACKGROUND

A network run by one operator in one country is known as a Public Land Mobile Network (PLMN). A subscribed user uses the operator's PLMN (also referred to as the home PLMN) to gain access to the network. When the user moves outside of the home network, the user becomes a roaming user and needs to use the resources from other operators' networks, also referred to as visited PLMN(s). Roaming is supported by access technologies that complies with the Third-Generation Partnership Project (3GPP) standard (also known as 3GPP access technologies) as well as non-3GPP access technologies.

BRIEF DESCRIPTION OF THE DRAWINGS

Detailed descriptions of implementations of the present invention will be described and explained through the use of the accompanying drawings.

Figure 1:
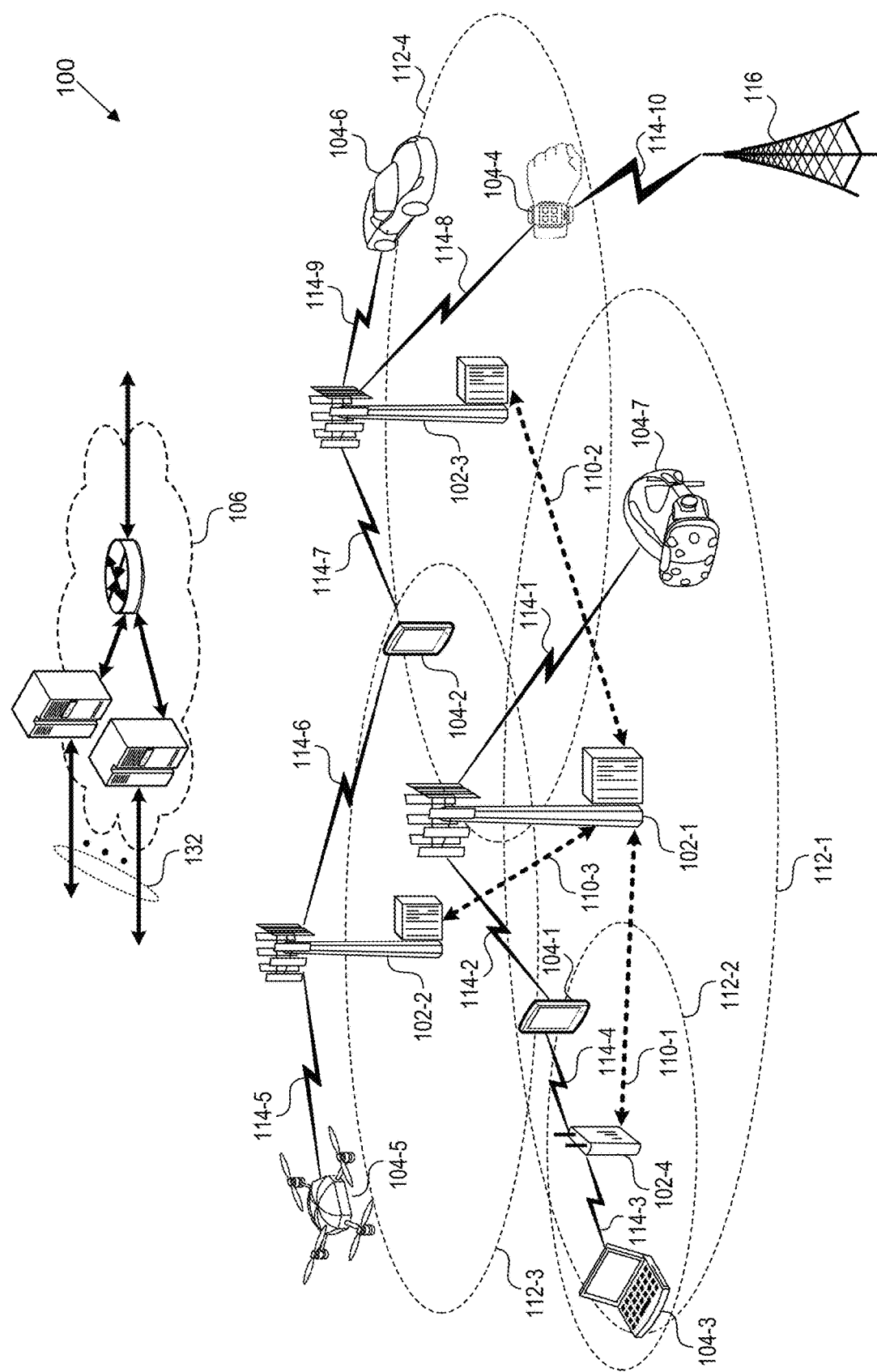
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A Use Equipment (UE) that roams from the Home PLMN (H-PLMN) to a Visited PLMN (V-PLMN) can be routed by the home network or the visited network to gain access to the network using 3GPP access technologies. For non-3GPP access (e.g., WiFi access), however, routing of the UE in the visited network is often limited by the network configurations configured by the home network, leading to transport costs and delay for the UE. This patent document discloses techniques that can be implemented in various embodiments to enable consistent and reliable non-3GPP access for mobile devices in visited networks when they are roaming so as to minimize communication costs to the home networks, thereby improving roaming experiences for the users.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE)/LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Non-Cellular Roaming in Cellular Communications System

The LTE communication systems support the integration of non-3GPP accesses (e.g. Wi-Fi access) into the Evolvement Packet Core (EPC). Similarly, the integration of untrusted non-3GPP access into the 5th Generation Core (5GC) is also supported in the New Radio (NR) communication systems. Integration of non-3GPP access, such as Wi-Fi access, into the core networks enables mobile services to be provided through various access technologies.

Figure 2:
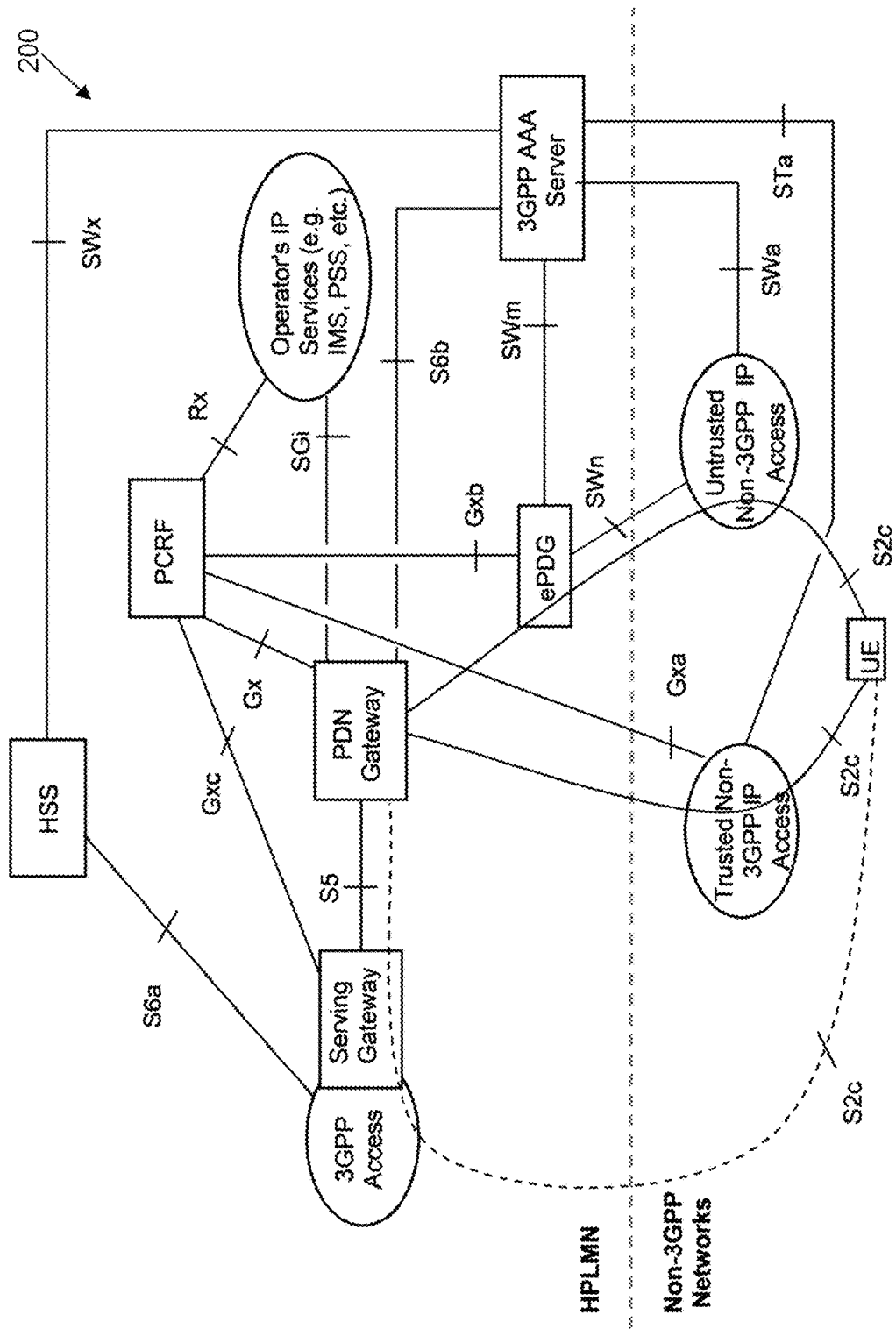
FIG. 2 illustrates an example of non-roaming architecture.

Non-3GPP access is divided into two types of scenarios, one type for trusted access and another type for untrusted access. In the case of trusted Access, a UE connects directly to the Packet Data Node (PDN) Gateway. In the case of untrusted access, an additional Internet Protocol Security (IPsec) tunnel is established between the UE and the Evolved Packet Data Gateway (ePDG). The ePDG then forwards the user traffic to the PDN Gateway after a successful IPsec tunnel setup. FIG. 2 illustrates an example of non-roaming architecture 200.

Figure 3A:
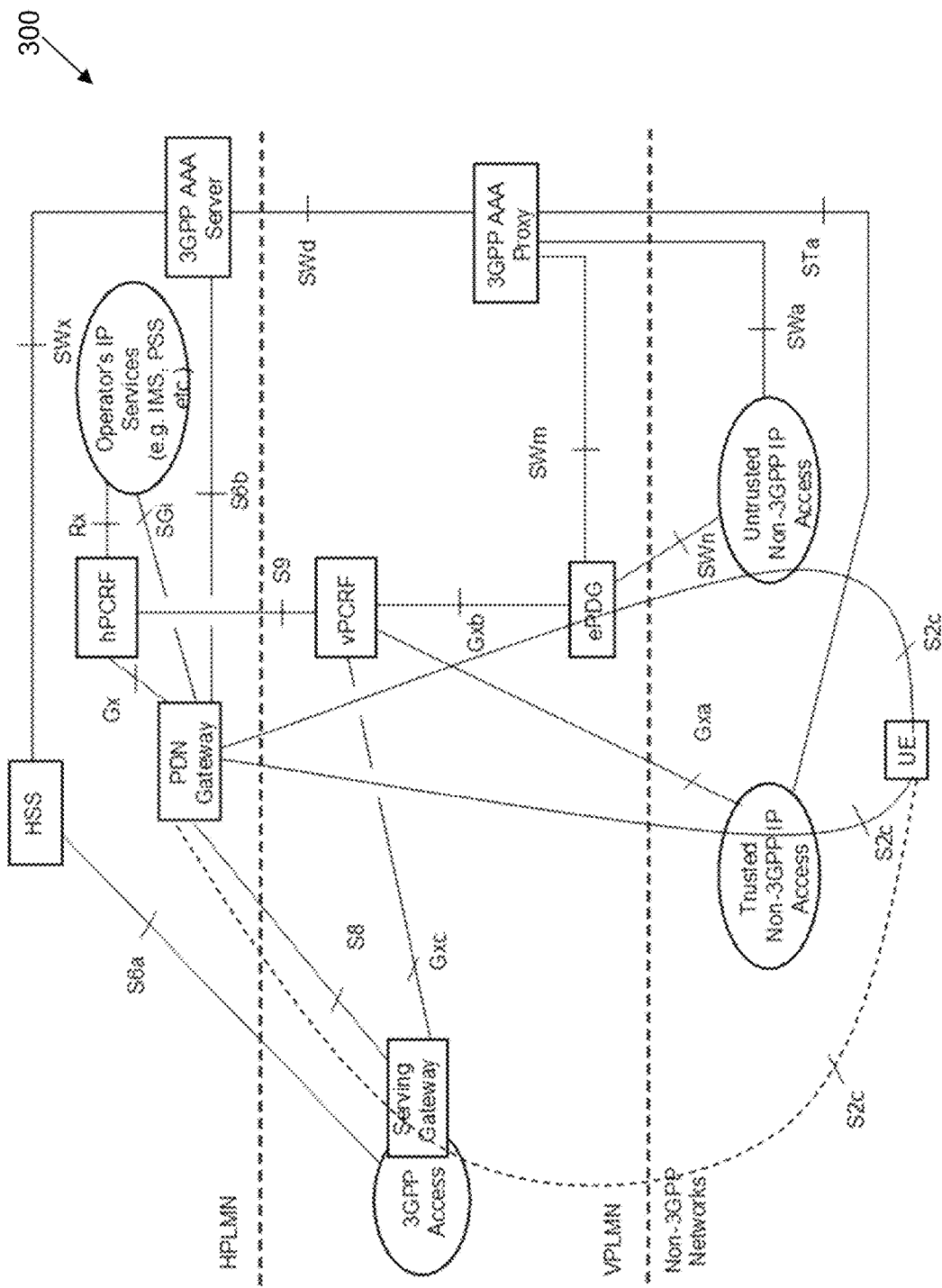
FIG. 3A illustrates an example of roaming architecture that is home routed.
Figure 3B:
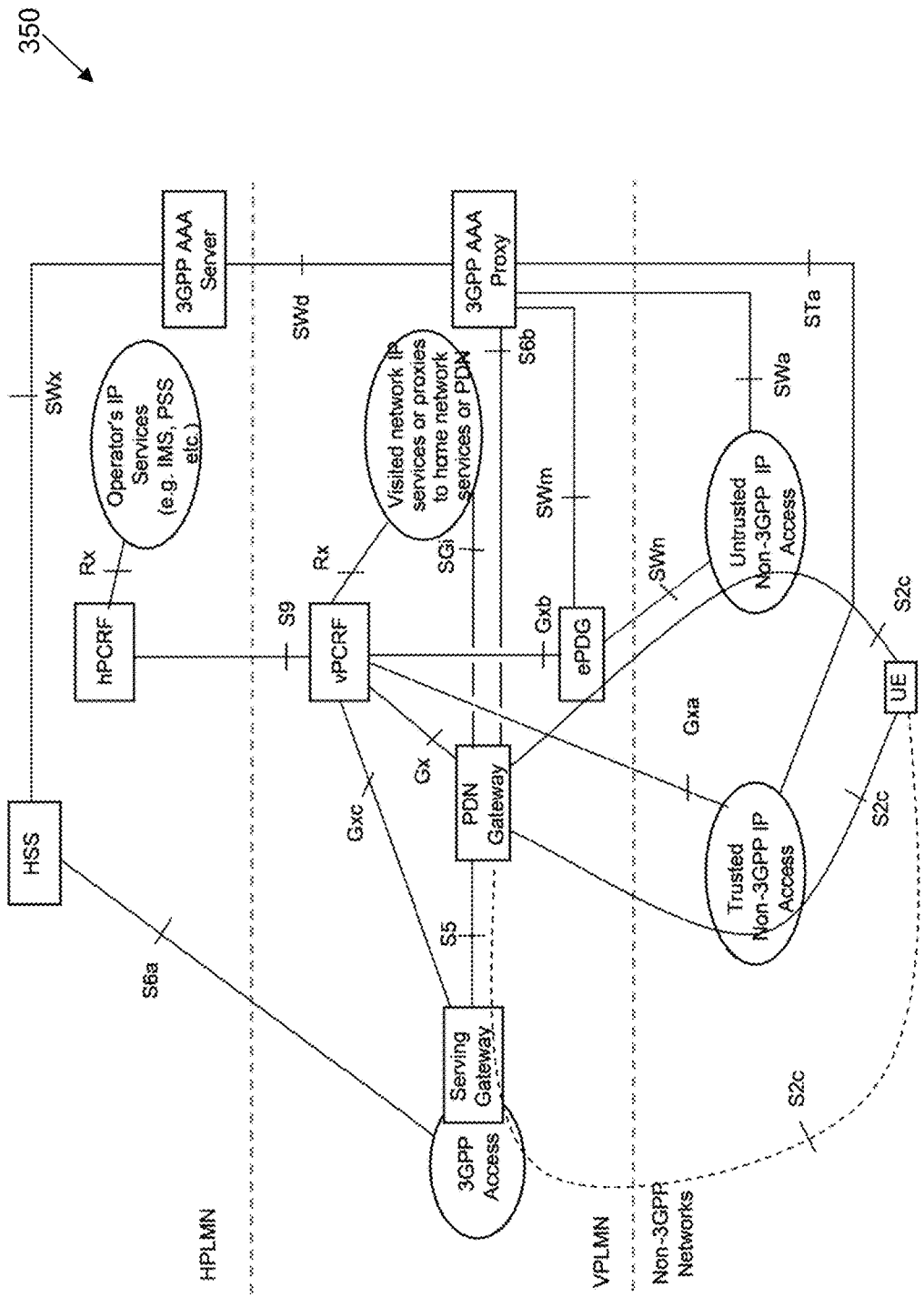
FIG. 3B illustrates an example of roaming architecture that uses local breakout.

When the UE roams from the H-PLMN to a V-PLMN, the UE can be routed by the home network. FIG. 3A illustrates an example of roaming architecture 300 that is home routed. Alternatively, or in addition, local breakout can be used when the UE roams to a VPLMN. Local breakout is a policy-based forwarding function that plays an important role in inter-provider roaming between service providers, as it can be more beneficial to locally breakout a roaming UE on a foreign network to avoid incurring the additional transport costs to backhaul the traffic to the home network. FIG. 3B illustrates an example of a roaming architecture 350 that uses local breakout. If two mobile operators have a roaming agreement in place, local break-out enables the visited user to attach to the V-PLMN network and be anchored by the local gateway in the visited network.

However, local breakout for non-3GPP access can be limited by ePDG selection information configured by the H-PLMN. In general, the UE performs ePDG selection based on a set of information configured by the HPLMN and its knowledge of the V-PLMN that it is attached to. For example, if the UE determines to be located in a visited country other than its home country, the UE can check whether the V-PLMN matches any entry in the ePDG selection information provided by the H-PLMN. If so, the UE can select an ePDG in the V-PLMN based on the configured information. When the UE fails to connect to an ePDG in the V-PLMN based on the configured information provided by the H-PLMN, the UE can perform a Domain Name System (DNS) procedure to find an ePDG. The DNS response to the UE containing no record means that the visited country does not mandate the selection of ePDG. If the ePDG selection information configured by the H-PLMN fails to include information for the visited country or the V-PLMN, local breakout cannot be reliably provided to the UE. The UE falls back to the ePDG in the HPLMN, resulting in additional transport costs to the home network.

Figure 4:
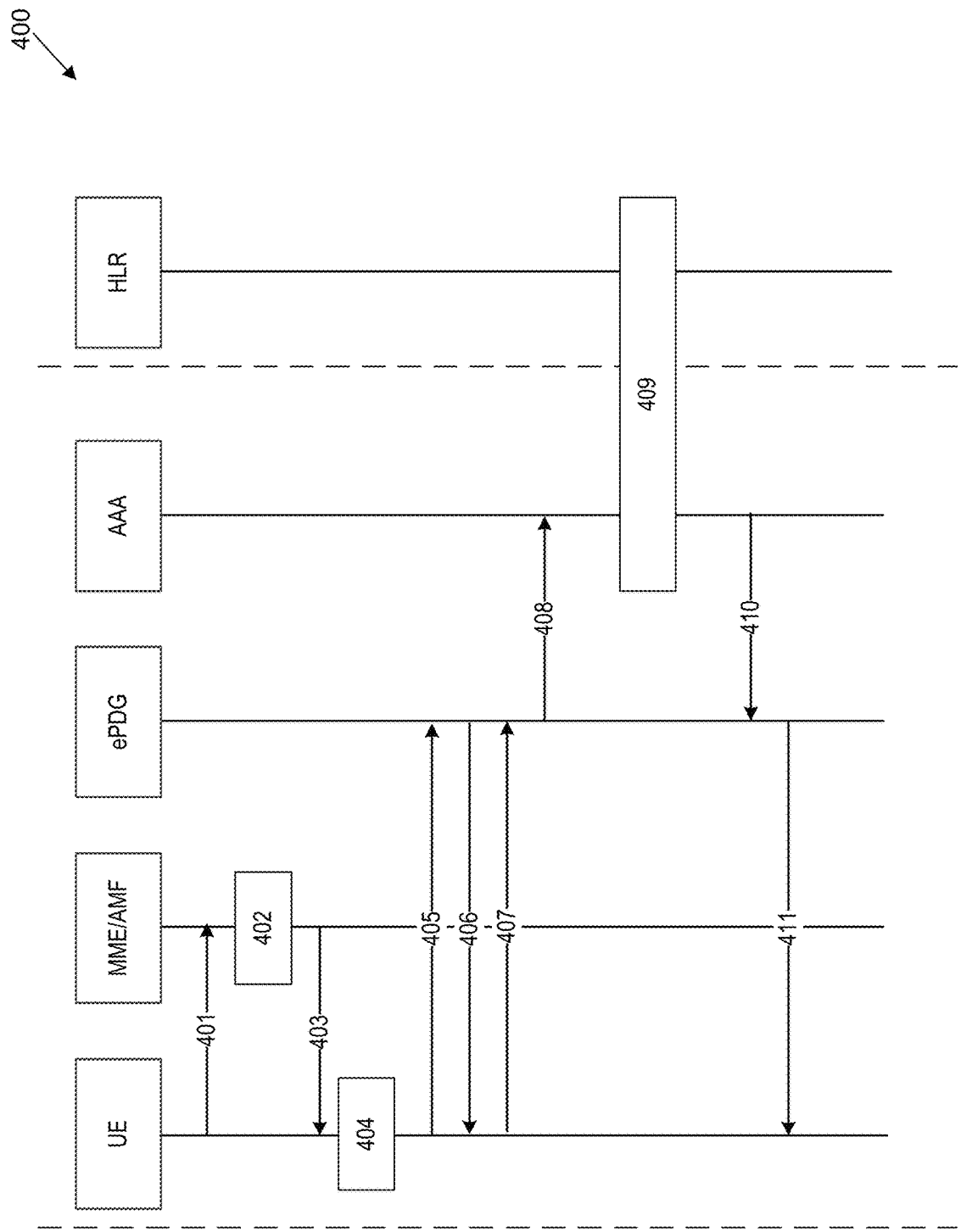
FIG. 4 illustrates an example sequence chart of a local breakout for non-3GPP roaming in accordance with one or more embodiments of the present technology.

This patent document discloses techniques that can be implemented in various embodiments to enable consistent and reliable local breakout for non-3GPP access so as to minimize communication costs to the home networks when the mobile devices are roaming. FIG. 4 illustrates an example sequence chart 400 of a local breakout for non-3GPP roaming in accordance with one or more embodiments of the present technology. As shown in FIG. 4, at operation 401, a roaming UE sends a connectivity request to a network node in the V-PLMN. The network node can be a node that manages mobility information in the network, such as a Mobility Management Entity (MME) in EPC or an Access and Mobility Management Function (AMF) in 5GC. The network node can transmit a create session request to a packet gateway (not shown) and get a corresponding create session response.

The network node then constructs, at operation 402, the ePDG IP address and/or Fully-Qualified Domain Name (FQDN) based on the visited network's operator identifier and/or the tracking/location area identity FQDN. The network node includes the constructed ePDG IP address and/or FQDN in a response message, and transmits, at operation 403, the response message to the UE. In some embodiments, the response message can also activate a default bearer context to establish the connection.

At operation 404, the UE determines to access the network using non-3GPP access (e.g., WiFi access). Because the UE has been provided the ePDG information of the V-PLMN by the network node, the UE can initiate the non-3GPP connection with the ePDG in the V-PLMN without solely relying on the ePDG selection information provided by the H-PLMN. For example, should the H-PLMN fail to include information for the visited country or the V-PLMN, the UE can use the provided ePDG address to enable local breakout of non-3GPP access in the visited network. The UE can transmit, at operation 405, an Internet Key Exchange (IKE) Security Association initiation (SA_INIT) request to the ePDG using the ePDG IP address and/or FQDN. The UE receives, at operation 406, a SA_INIT response in return, and transmits an IKE authorization request to the ePDG at operation 407.

At operation 408, the ePDG forwards an authorization request (e.g., Diameter-EAP-Request) to an Authentication Authorization Accounting (AAA) network element in the V-PLMN such that the AAA can exchange authentication and authorization information with the Home Location Register (HLR) in the H-PLMN via inter-networking functions (IWF) (not shown) at operation 409. In particular, the AAA network node can include the Mobile Country Code (MCC) and/or Mobile Network Code (MNC) in the information it transmits to the IWF to enable the authentication and authorization in the H-PLMN. For example, based on the authentication and authorization information, the network nodes in the H-PLMN (e.g., Home Location Register, HLR) can update the location information of the UE and provides subscriber data to the V-PLMN.

Upon receiving an authorization response (e.g., Diameter-EAP-Response) by the ePDG at operation 410, the ePDG can inform the UE at operation 411 in response to the IKE authorization request. The UE and the ePDG then continue to perform subsequent transmissions to allow the UE to gain non-3GPP access in V-PLMN.

Figure 5:
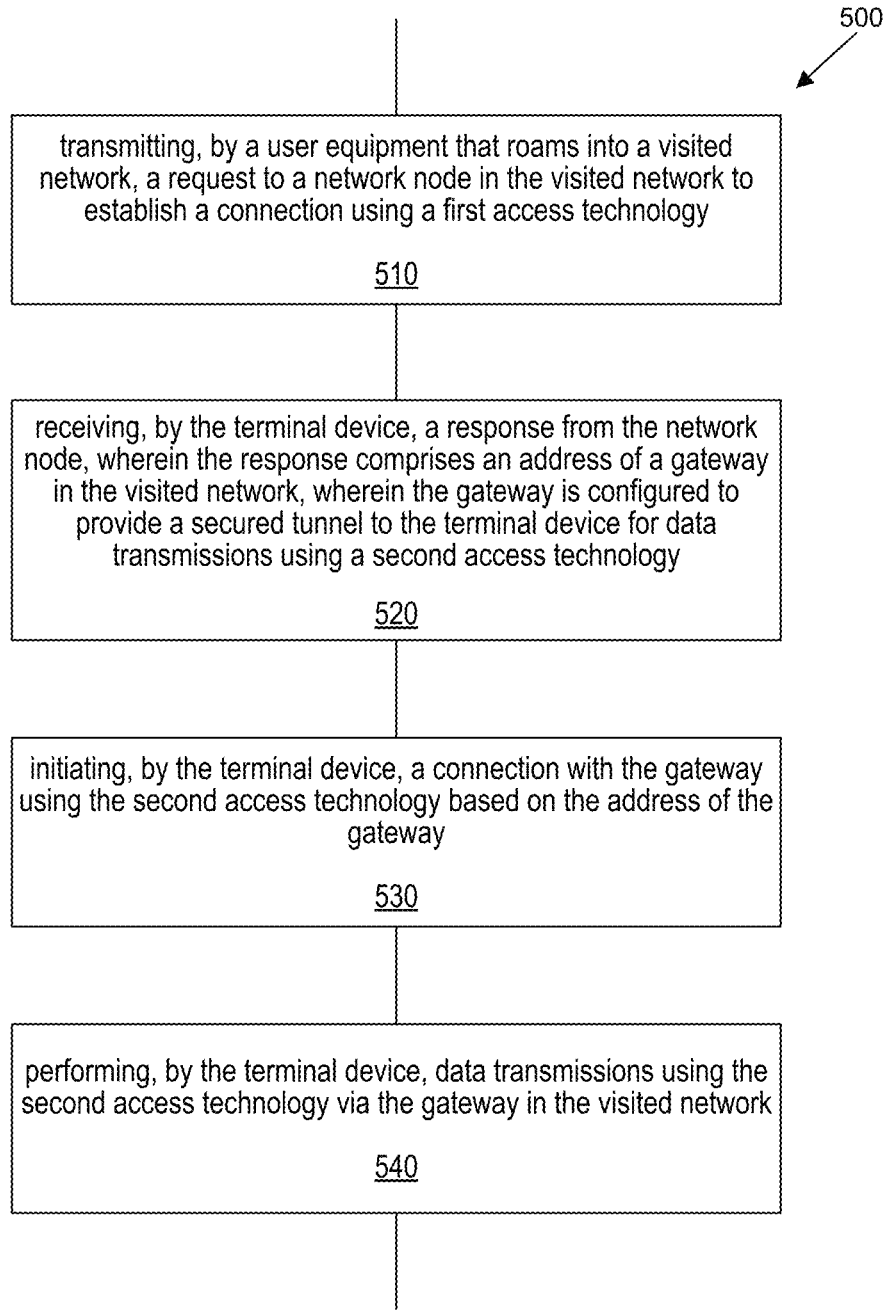
FIG. 5 is a flow chart representation of a method for wireless communication in accordance with one or more embodiments of the present technology.

FIG. 5 is a flow chart representation of a method 500 for wireless communication in accordance with one or more embodiments of the present technology. The method 500 includes, at operation 510, transmitting, by a user equipment that roams into a visited network, a request to a network node in the visited network to establish a connection using a first access technology. The terminal device is associated with a home network, and the network node is configured to manage mobility of the terminal device in the first network (e.g., the visited network). In some embodiments, the first access technology comprises a cellular access technology that complies with the 3GPP standard, such as the LTE/NR access technologies. The network node can be a Mobility Management Entity (MME) or an Access and Mobility Management Function (AMF).

The method 500 includes, at operation 520, receiving, by the terminal device, a response from the network node. The response comprises an address of a gateway in the visited network. The gateway is configured to provide a secured tunnel to the terminal device for data transmissions using a second access technology. For example, the gateway comprises an Evolved Packet Data Gateway, with which an IPSec tunnel is established to provide network access to the terminal device. The address of the gateway can be an IP address or a FQDN of the gateway. The second access technology can be a non-3GPP access technology, such as WLAN access technology or other technologies such as WiMax or CDMA.

The method 500 includes, at operation 530, initiating, by the terminal device, a connection with the gateway using the second access technology based on the address of the gateway. The method 500 also includes, at operation 540, performing, by the terminal device, data transmissions using the second access technology via the gateway in the visited network. That is, the terminal can gain non-3GPP access in the visited network without being routed to the home network, thereby reducing network transport cost.

Figure 6:
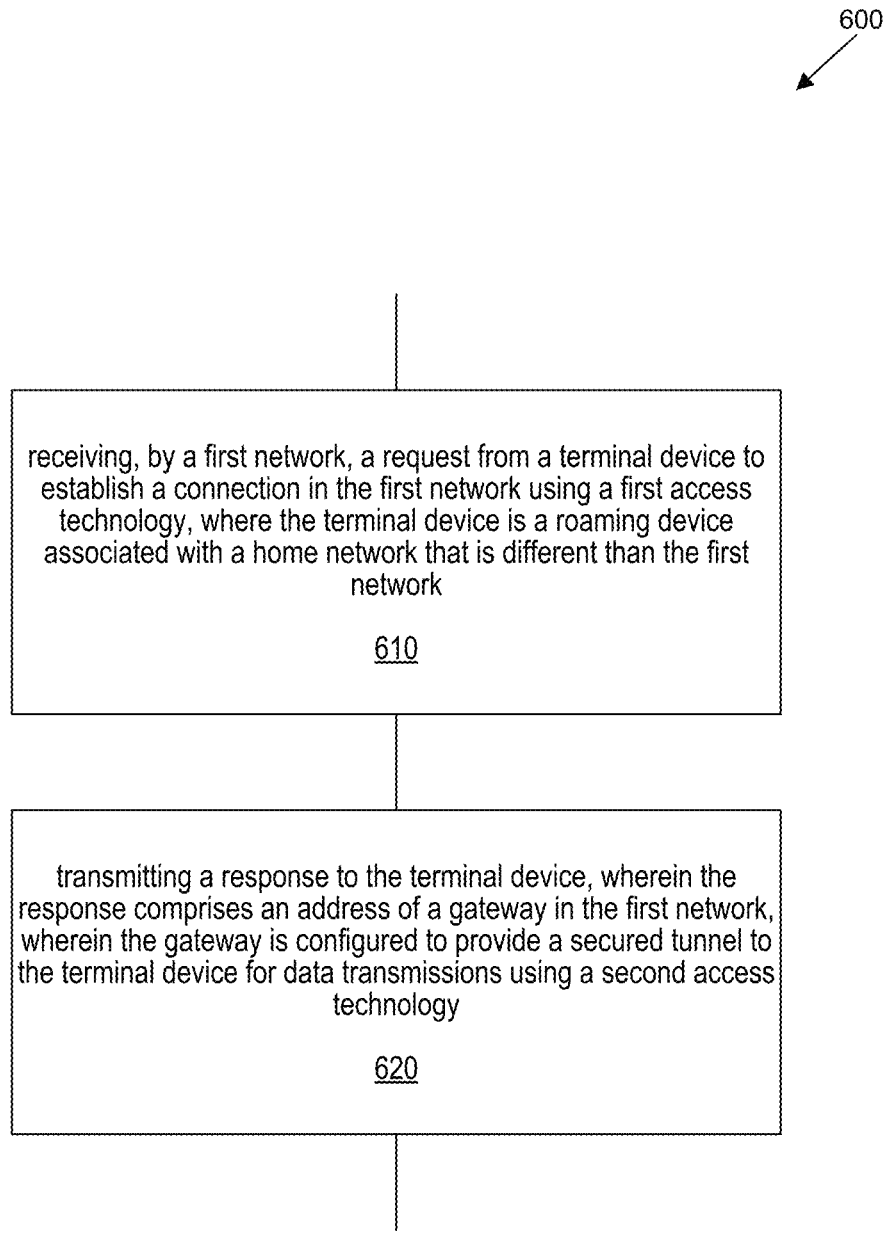
FIG. 6 is a flow chart representation of a method for wireless communication in accordance with one or more embodiments of the present technology.

FIG. 6 is a flow chart representation of a method 600 for wireless communication in accordance with one or more embodiments of the present technology. The method 600 includes, at operation 610, receiving, by a first network, a request from a terminal device to establish a connection in the first network using a first access technology. The terminal device is a roaming device associated with a home network that is different than the first network (e.g., a visited network).

The method 600 also includes, at operation 620, transmitting a response to the terminal device. The response comprises an address of a gateway in the first network. The gateway is configured to provide a secured tunnel to the terminal device for data transmissions using a second access technology.

In some embodiments, the method includes constructing, by a network node of the first network, the address of the gateway in the first network. In some embodiments, the method includes transmitting, by a network node in the first network, the response that comprises the address of the gateway in the first network, where the network node is configured to manage mobility of the terminal device in the first network. In some embodiments, the method further includes receiving, by the gateway of the first network, a request from the terminal device to initiate a connection using the second access technology, where the request includes a mobile country code or a mobile network code of the terminal device, and authenticating, by the first network, the terminal device with the home network of the terminal device using the mobile country code or the mobile network code.

In some embodiments, the first access technology conforms to a Third-Generation Partnership Project (3GPP) standard and the second access technology conforms to a non-3GPP standard. In some embodiments, the gateway comprises an Evolved Packet Data Gateway. In some embodiments, the address of the gateway comprises an Internet Protocol (IP) address of the gateway or a Fully-Qualified Domain Name (FQDN) of the gateway.

In another example aspect, a wireless communication system is disclosed. The system includes a terminal device associated with a home network and a network that the terminal device roams into. The network includes a network node configured to manage mobility of the terminal device in the network and a gateway configured to provide a secured tunnel to the terminal device for data transmissions using a second access technology. The terminal device is configured to transmit a request to establish a connection in the network using a first access technology. The network node of the network is configured to transmit a response to the terminal. The response comprises an address of the gateway in the network to enable the terminal device to perform data transmissions using the second access technology via the gateway.

In some embodiments, the first access technology conforms to a Third-Generation Partnership Project (3GPP) standard. In some embodiments, the second access technology conforms to a non-3GPP standard. In some embodiments, the gateway comprises an Evolved Packet Data Gateway. In some embodiments, the address of the gateway comprises an Internet Protocol (IP) address of the gateway or a Fully-Qualified Domain Name (FQDN) of the gateway. In some embodiments, the network node comprises a Mobility Management Entity (MME) or an Access and Mobility Management Function (AMF).

It is thus appreciated that, by providing the ePDG address of the V-PLMN (e.g., IP address or FQDN of the ePDG) to the UE directly, usage of local breakout for non-3GPP access is not restricted by the configuration information of the H-PLMN. Local breakout using V-PLMN network access can be provided by the network provider(s) more flexibly and reliably, thereby reducing transport costs and enhancing network connection speed for roaming devices.

Computer System

Figure 7:
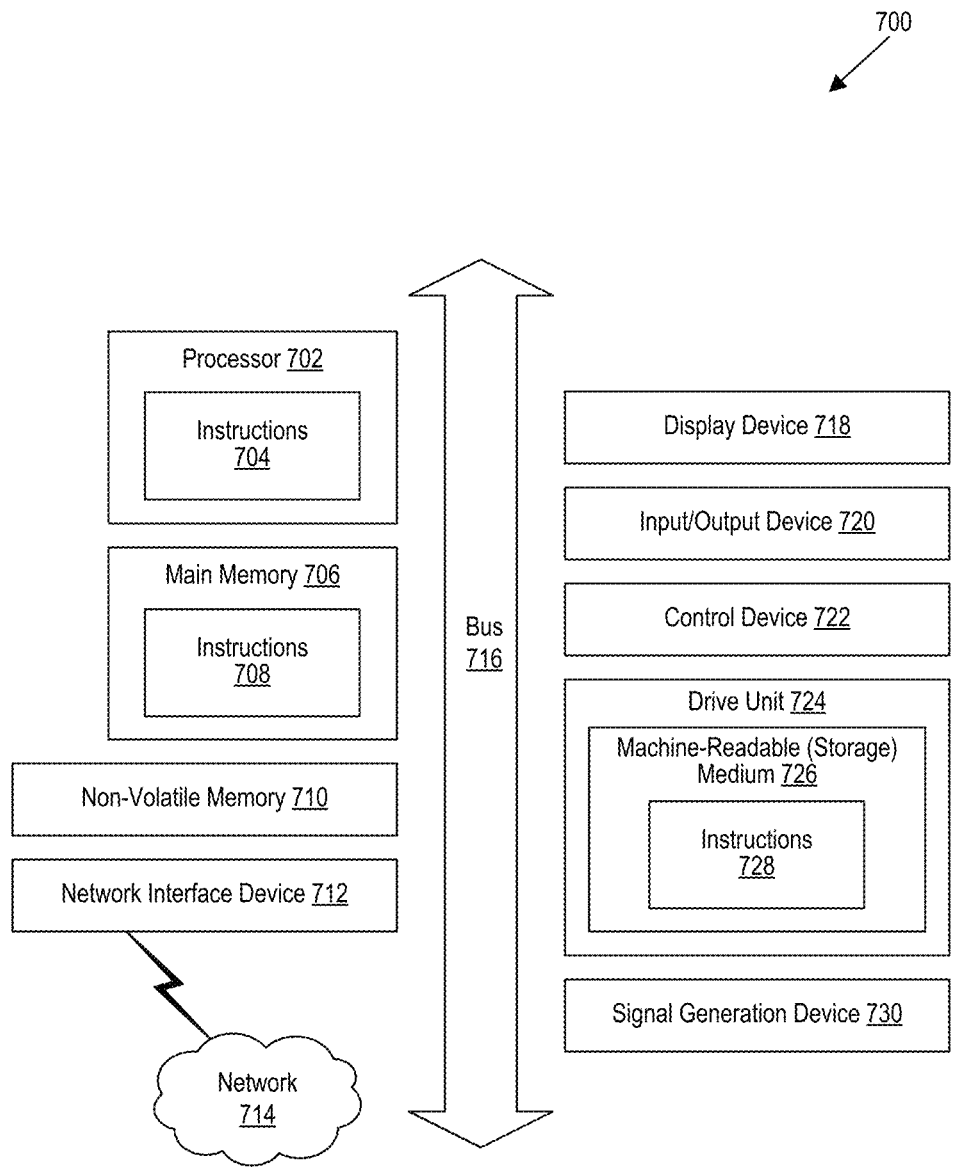
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example," "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable medium, excluding transitory signals, carrying instructions, which when executed by at least one data processing device, performs operations comprising:
   transmitting, by a terminal device that roams into a visited network, a request to a network node in the visited network to establish a first connection using a first access technology,
      wherein the terminal device is configured by a home network with configuration information about one or more gateways that provide a first secure tunnel to the terminal device using a second access technology different from the first access technology, and
      wherein the network node is configured to manage mobility of the terminal device in the visited network;
   receiving, by the terminal device, a response from the network node in the visited network,
      wherein the response comprises an address of a gateway in the visited network, and
      wherein the gateway in the visited network is configured to provide a second secured tunnel to the terminal device using the second access technology;
   attempting to determine, by the terminal device, the gateway in the visited network (1) using the configuration information configured by the home network, and (2) upon a failure to determine the gateway using the configuration information, by performing a Domain Name System (DNS) procedure based on information of the visited network;
   upon failing to determine the gateway in the visited network based on the configuration information from the home network and the DNS procedure, initiating, by the terminal device, a second connection with the gateway in the visited network using the second access technology based on the address of the gateway in the visited network included in the response from the network node in the visited network; and
   performing, by the terminal device, one or more data transmissions using the second access technology via the gateway in the visited network.

2. The computer-readable medium of claim 1, wherein the first access technology conforms to a Third-Generation Partnership Project (3GPP) standard.

3. The computer-readable medium of claim 1, wherein the second access technology conforms to a non-3GPP standard.

4. The computer-readable medium of claim 1, wherein the second access technology comprises a WiFi access technology.

5. The computer-readable medium of claim 1, wherein the one or more gateways configured by the home network or the gateway in the visited network comprises an Evolved Packet Data Gateway.

6. The computer-readable medium of claim 1, wherein the address of the gateway in the visited network comprises an Internet Protocol (IP) address of the gateway or a Fully-Qualified Domain Name (FQDN) of the gateway.

7. The computer-readable medium of claim 1, wherein the network node comprises a Mobility Management Entity (MME), or an Access and Mobility Management Function (AMF).

8. A method for wireless communication, comprising:
   receiving, by a first network that comprises multiple network nodes, a request from a terminal device to establish a first connection in the first network using a first access technology,
      wherein the terminal device is a roaming device associated with a home network that is different than the first network, the terminal device configured by the home network with configuration information about one or more gateways that provide a first secure tunnel to the terminal device using a second access technology different from the first access technology, the terminal device further configured to perform a Domain Name System (DNS) procedure based on information of the first network;
   constructing, by the first network, an address of a gateway in the first network based on an identifier of the first network; and
   transmitting, by the first network, a response to the terminal device,
      wherein the response comprises the address of the gateway in the first network,
      wherein the gateway in the first network is configured to provide a second secured tunnel to the terminal device for data transmissions using the second access technology upon the terminal device failing to determine the gateway in the first network based on the configuration information configured by the home network and, upon a failure using the configuration information configured by the home network, by the DNS procedure based on the information of the first network.

9. The method of claim 8, further comprising:
   constructing, by a first network node of the first network, the address of the gateway in the first network.

10. The method of claim 9, further comprising:
    transmitting, by the first network node in the first network, the response that comprises the address of the gateway in the first network, wherein the first network node is configured to manage mobility of the terminal device in the first network.

11. The method of claim 8, further comprising:
    receiving, by the gateway of the first network, a second request from the terminal device to initiate a second connection using the second access technology, wherein the request includes a mobile country code or a mobile network code of the terminal device; and
    authenticating, by a second network node in the first network, the terminal device with the home network of the terminal device using the mobile country code or the mobile network code.

12. The method of claim 8, wherein the first access technology conforms to a Third-Generation Partnership Project (3GPP) standard and the second access technology conforms to a non-3GPP standard.

13. The method of claim 8, wherein the one or more gateways configured by the home network or the gateway in the first network comprises an Evolved Packet Data Gateway.

14. The method of claim 8, wherein the address of the gateway in the first network comprises an Internet Protocol (IP) address of the gateway or a Fully-Qualified Domain Name (FQDN) of the gateway.

15. A wireless communication system, comprising:
    a terminal device associated with a home network, the terminal device configured by the home network with configuration information about one or more gateways that provide a first secure tunnel to the terminal device using a second access technology, the terminal device further configured to perform a Domain Name System (DNS) procedure based on information of a visited network; and the visited network that the terminal device configured to roam into, the visited network comprising a network node configured to manage mobility of the terminal device in the visited network and a gateway in the visited network configured to provide a second secured tunnel to the terminal device using the second access technology,
- wherein the network node is configured to receive a request from the terminal device to establish a connection in the visited network using a first access technology,
- wherein the network node is configured to construct an address of the gateway in the visited network based on an identifier of the visited network,
- wherein the network node of the visited network is configured to transmit a response to the terminal device, and
- wherein the response comprises the address of the gateway in the visited network to enable the terminal device to perform data transmissions using the second access technology via the gateway in the visited network upon the terminal device failing to determine the gateway in the visited network based on the configuration information configured by the home network and, upon a failure using the configuration information, the DNS procedure based on the information of the visited network.

16. The system of claim 15, wherein the first access technology conforms to a Third-Generation Partnership Project (3GPP) standard.

17. The system of claim 15, wherein the second access technology conforms to a non-3GPP standard.

18. The system of claim 15, wherein the one or more gateways configured by the home network or the gateway in the visited network comprises an Evolved Packet Data Gateway.

19. The system of claim 15, wherein the address of the gateway in the visited network comprises an Internet Protocol (IP) address of the gateway or a Fully-Qualified Domain Name (FQDN) of the gateway.

20. The system of claim 15, wherein the network node comprises a Mobility Management Entity (MME) or, an Access and Mobility Management Function (AMF).

* * * * *